United States Patent [19]

Stevens

[11] Patent Number: 5,427,831
[45] Date of Patent: Jun. 27, 1995

[54] FLUOROPOLYMER LAMINATES

[75] Inventor: Ronald D. Stevens, Norton, Ohio

[73] Assignee: E. I. Du Pont de Nemours and Company, Wilmington, Del.

[21] Appl. No.: 249,551

[22] Filed: Jun. 2, 1994

Related U.S. Application Data

[63] Continuation-in-part of Ser. No. 150,906, Nov. 12, 1993, Pat. No. 5,320,888.

[51] Int. Cl.$^6$ .......................... B32B 1/08; B32B 27/28
[52] U.S. Cl. ................................ 428/36.2; 428/36.8; 428/36.91; 428/252; 428/421; 428/422
[58] Field of Search .................. 428/36.2, 36.8, 36.91, 428/252, 421, 422

[56] References Cited

U.S. PATENT DOCUMENTS 4,806,351  2/1989  Sugimoto et al. .................. 428/421
5,320,888  6/1994  Stevens ............................. 428/36.2

FOREIGN PATENT DOCUMENTS 51-77771  7/1993  Japan .

OTHER PUBLICATIONS

Japanese Patent Publication 51 7771 Dewent Abstract of Patent Issued Jul. 20, 1993.

Primary Examiner—James C. Cannon

[57] ABSTRACT

Laminates of low swell elastomer, non-elastomeric fluoropolymer, and elastomer provide an excellent combination of flexibility and fuel permeation resistance.

17 Claims, 1 Drawing Sheet

FIG.1

FIG.2

FLUOROPOLYMER LAMINATES

This application is a continuation-in-part of U.S. patent application Ser. No. 08/150,906 filed Nov. 12, 1993, now U.S. Pat. No. 5,320,888.

BACKGROUND OF THE INVENTION

Fluoroelastomers, such as those described in U.S. Pat. Nos. 3,682,872; 4,281,092; and 4,592,784 have achieved outstanding commercial success and are used in a wide variety of applications in which unusually severe environments are encountered. However, unusual performance attributes are required of elastomers used to fabricate fuel hoses and fuel pump diaphragms. One attempt to satisfy this need was described in Sugimoto et. al. U.S. Pat. No. 4,806,351 in which a composite of a fluoroelastomer was bonded to a layer of butadiene acrylonitrile rubber (NBR). Despite the development of such laminates, a continuing need exists for materials which can be used for fabrication of hoses and diaphragms having greater fuel permeation resistance. A problem in satisfying this need is the provision of materials which exhibit both flexibility and high fuel permeation resistance.

SUMMARY OF THE INVENTION

The present invention provides an improved polymer laminate which exhibits an outstanding combination of flexibility and fuel permeation resistance.

Specifically, the present invention provides a laminar structure comprising, and bonded together in the order specified,
  (a) a first layer, having a thickness of 0.1 to 1.5 mm, comprising an elastomer which, when cured, has a volume swell no greater than 65%, as determined according to ASTM D 471, Reference Fuel C, 70 hours;
  (b) a second layer, having a thickness of 0.01 to 0.1 mm, comprising a non-elastomeric fluoropolymer which has been treated to promote adhesion; and
  (c) a third layer, having a thickness of 0.1 to 4.0 mm, comprising an elastomer.

DETAILED DESCRIPTION OF THE INVENTION

The present invention is a laminar structure comprising a first layer of a fuel-resistant elastomer, a second layer of a non-elastomeric fluoropolymer, and a third layer of an elastomeric polymer. Such laminates are particularly useful in fabrication of hoses and diaphragms which contact fuel compositions.

The fuel-resistant elastomers which comprise the first layer of the laminates of the, present invention are selected from those elastomers which, when cured, have volume swells no greater than 65% as determined according to ASTM D 471, Reference Fuel C, 70 hours. Such elastomers include acrylonitrile butadiene rubbers having acrylonitrile contents greater than 25% by weight; hydrogenated acrylonitrile butadiene rubbers; copolymers of epichlorohydrin and ethylene oxide; and fluoroelastomers, which are preferred.

The fluoroelastomers generally contain copolymerized units of vinylidene fluoride and hexafluoropropylene, and, optionally, copolymerized units of tetrafluoroethylene. Other monomers that are also suitable include chlorotrifluoroethylene, hydrocarbon olefins such as ethylene or propylene, and perfluoro(alkyl vinyl) ethers having the formula $CF_2=CFO(CF_2CFXO)_nR_f$ wherein X if F or $CF_3$, n is 0–5, and $R_f$ is a perfluoroalkyl group of 1–6 carbon atoms. A preferred perfluoro(alkyl vinyl) ether for use in hydrogen-containing fluoroelastomers is perfluoro(methyl vinyl) ether. Suitable fluoroelastomers include copolymers of tetrafluoroethylene, vinylidene fluoride, and perfluoro(methyl vinyl) ether; copolymers of ethylene, tetrafluoroethylene, and perfluoro(methyl vinyl) ether; copolymers of propylene and tetrafluoroethylene; and copolymers of tetrafluoroethylene, propylene, and vinylidene fluoride. Compositions which have the requisite fuel resistance are generally those having fluorine contents of at least 50%, especially at least 65 wt% fluorine. Preferred compositions are those which, when cured, exhibit volume swells of less than 5% according to ASTM D 471, 70 hours, Reference Fuel C.

Representative peroxide-curable fluoroelastomers which are suitable for use as the fuel-resistant elastomer layer are described in U.S. Pat. Nos. 4,035,565; 4,243,770; 4,564,662; 4,745,154; 4,948,852; 4,973,633; 4,948,853; 4,281,092; 4,529,784; 4,972,038 and 5,177,148.

The thickness of the fuel-resistant elastomer layer is generally from 0.1 to 1.5 mm. Thicknesses of less than 1.0 mm are particularly useful in fabrication of fuel hoses and diaphragms.

The second layer of the laminate of the present invention has a thickness of 0.01 to 0.1 mm, preferably 0.01 to 0.05 mm, and comprises a non-elastomeric fluoropolymer. Suitable compositions include polyvinylidene fluoride and copolymers of vinylidene fluoride with at least one monomer selected from the group consisting of hexafluoropropylete and tetrafluoroethylene. Preferred non-elastomeric fluoropolymers are tetrafluoroethylene polymers, including polytetrafluoroethylene, copolymers of tetrafluoroethylene and hexafluoropropylene, copolymers of tetrafluoroethylene and perfluoro(alkyl vinyl) ethers, and copolymers of tetrafluoroethylene and ethylene. Copolymers of ethylene and chlorotrifluoroethylene may also be employed. The non-elastomeric fluoropolymer layer is treated to promote adhesion, for example by plasma treatment, corona discharge treatment, sodium etching, and the like, preferably by conventional corona discharge treatment.

The third layer of the laminates of the present invention is comprised of elastomers having a thickness of 0.1 to 4 mm, preferably 1.0–2.5 mm. For typical fuel hose and diaphragm applications, a thickness of less than 2.0 mm has been found to be particularly satisfactory. A wide variety of known elastomers can be used in this layer, so long as the layer does not directly contact fuel. Suitable elastomers include, for example, butadiene acrylonitrile rubber; epichlorohydrin rubber; chlorosulfonated polyolefins, such as chlorosulfonated polyethylene and chlorosulfonated ethtylene alpha-olefin copolymers; polychloroprene homopolymers and copolymers; ethylene/propylene copolymer rubber and EPDM copolymer rubbers; copolymers of ethylene with polar monomers such as methyl acrylate or ethyl acrylate; chlorinated olefin polymers, such as chlorinated polyethylene; polysiloxanes, including fluorinated polysiloxanes; thermoplastic elastomers such as polyetheresters, polyesteresters, polyeramides, and polyethereramides; dynamically cured thermoplastic elastomers such as EPDM/polypropylene blends; and fluoroelastomers, such as copolymers of vinylidene fluoride and hexafluoropropylene; and copolymers of vinylidene fluoride, hexafluoropropylene, and tetrafluoroethylene. Perfected polymers are those which have a good combination of flexibility and mechanical strength, for example chlorosulfonated polyethylene, acrylonitrile butadiene rubber, and epichlorohydrin-ethylene oxide copolymers.

In a further embodiment of the invention, the third layer may comprise any of the elastomers which are suitable for use as the fuel-resistant composition of the first layer of the laminate of the present invention. Such compositions, especially those wherein the first layer is a fluoroelastomer, are particularly useful in applications such as high temperature diaphragms and seals wherein fuel-resistance and high temperature resistance are necessary.

In addition to these three basic layers, further layers can be provided to improve overall performance characteristics of articles prepared from the laminates. For example, reinforcing braiding can be incorporated into the structure, either between the non-elastomeric fluoropolymer layer and the elastomer of the third layer, or, alternatively, between the third layer and any additional covering layers. A wide variety of materials can be used for the reinforcing braiding, including, for example, glass fiber: or polymeric fiber. Of these, polymeric fibers, and especially those consisting essentially of oriented polyester or polyammid, are preferred.

The elastomeric compositions of the first and third layers of the present invention also generally include commonly used compounding additives such as fillers, curatives, plasticizers, and antioxidants. The elastomer compositions are generally compounded with curatives and additives in a Banbury mixer or on a rubber mill and sheeted out from the mill or by use of a calender at temperatures below the curing temperature of the elastomer. Lamination of the elastomeric and fluoropolymer layers and cure of the elastomeric layers generally takes place in a single operation, for example, by heating the laminate, optionally under pressure, at temperatures of: from 140° –200° C.

Figure 1:
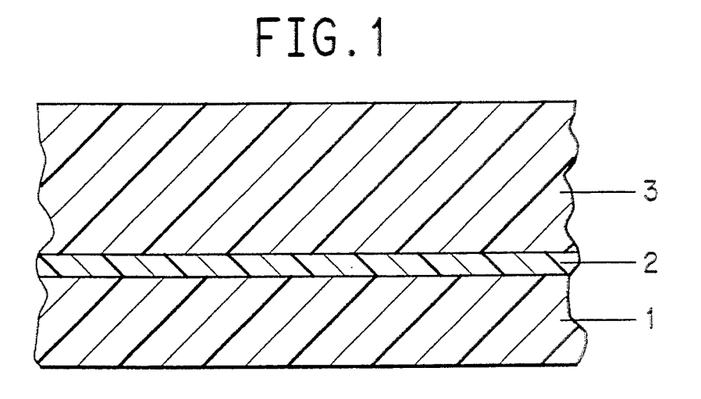
FIG. 1 is a cross-sectional illustration of a laminar structure of the present invention.
Figure 2:
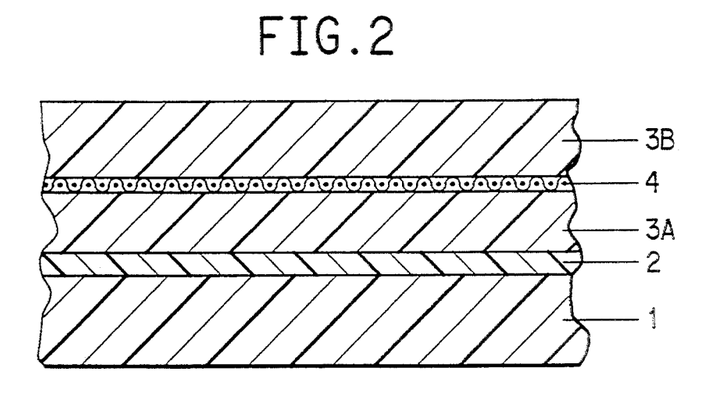
FIG. 2 is a cross-sectional illustration of a preferred laminar structure of the present invention.

The present laminates are illustrated in the Figures. In FIG. 1, fuel-resistant elastomer layer 1 is bonded to non-elastomeric fluoropolymer 2 which is, in turn, bonded to elastomer 3. In the preferred embodiment shown in FIG. 2, the elastomer layer 3 comprises two layers 3A and 3B, between which is reinforcing braiding 4.

In a typical preparation of the present laminates, particularly for hose applications, the layers are applied to a central mandrel in the required order, after which the structure is cured by heating at elevated temperatures, for example, 150° –200° C.

Although the compositions of the present invention are particularly suited for use as fuel hoses and diaphragms, they may also be used to fabricate other articles for which flexibility and low permeation are required, for example, chemical transfer hoses, especially those for toxic agrochemicals; boots; gaskets; and seals.

The present invention is further illustrated by the following embodiments in which all parts are by weight unless otherwise indicated.

EXAMPLES

Example 1 and Control Example A

A diaphragm was prepared by bonding together three separate 6 inch (15.2 cm) square sheets of three polymer compositions. The first sheet was a 0.030 inch (0.76 mm) thick sheet composed of a compounded elastomeric fluoropolymer composition prepared from a fluoroelastomer precompound containing a copolymer of vinylidene fluoride, hexafluoropropylene, and tetrafluoroethylene containing 0.2 wt % iodine (weight ratio of monomers 36/36/28; Mooney viscosity, $ML_{1+4}$ 100° C., 20) and containing 0.4 phr tetrabutyl ammonium bromide and 2.8 phr of an accelerator and bisphenol AF based curative system (VITON ® Curative No. 50, available from E. I. du Pont de Nemours and Co.). The fluoroelastomer precompound was compounded with the following ingredients in a Banbury mixer as shown in Table I.

TABLE I

| Fluoroelastomer Compound | |
|---|---|
| Ingredient | Parts By Weight |
| Fluoroelastomer Precompound | 100 |
| MgO | 6 |
| MT Black (N990) | 15 |
| Magesium Silicate | 20 |
| Carnauba Wax | 1 |
| $Ca(OH_2)$ | 4 |
| Triallylisocyanurate | 0.8 |
| Peroxide Curing Agent[1] | 0.8 |

[1]LUPERCO ® 101XL peroxide [45% 2,5-dimethyl-2,5-bis(t-butylperoxy)hexane on an inert filler]

The second sheet was a 0.002 inch (0.05 mm) thick corona discharge treated film of a copolymer of tetrafluoroethylene and hexafluoropropylet (TEFLON ® FEP fluorocarbon film 200C20, available from E. I. du Pont de Nemours and Co.). The third sheet was a 0.050 inch (1.27 mm) thick layer of a compounded blend of two chlorosulfonated polyethylenes, both having chlorine contents of 35 wt % and sulfur contents of 1 wt %, the blend containing 50 parts of chlorosulfonated polyethylene 1 having a Mooney viscosity ($ML_{1+4}$@ 100° C.) of 50–60 and 50 parts of chlorosulfonated polyethylene 2 having a Mooney viscosity ($ML_{1+4}$@100° C.) of 25–35. The compounding formulation was as follows, as shown in TABLE II.

TABLE II

| Chlorosulfonated Polyethylene Blend Formulation | |
|---|---|
| Ingredient | Parts By Weight |
| Polymer 1 | 50 |
| Polymer 2 | 50 |
| MgO | 20 |
| $Ca(OH_2)$ | 10 |
| Kenflex A Plasticizer[1] | 5 |
| SRF Black (N762) | 40 |
| $CaCO_3$ | 60 |
| Dioctyl Sebacate | 15 |
| Polyethylene Process Aid | 5 |
| Polyethylene Glycol Process Aid | 5 |
| Triallylcyanurate Dispersion[2] | 4.5 |
| Peroxy Curing Agent[2] | 7 |

[1]Alkylnaphthalene formalite
[2]TAC DRIMIX ® (70% triallylcyanurate on an inert carrier)
[3]DICUP ® 40KE peroxide (40% dicumyl peroxide on clay)

The three layer laminate was cured in a mold for 30 minutes at 162° C. After demolding, the samples were cut into 3 inch (7.6 cm) diameter round discs which were tested in Thwing Albert permeation cups using M25 fuel (75% Fuel C/25% methanol) as well as a mixture of 90% Fuel C and 10% ethanol. The test method for Thwing Albert cups is described in detail in Fuel-Alcohol Permeation Rates of Fluoroelastomers, Fluoroplastics, and ,Other Fuel Resistant Materials, W. M. Stahl and R. D. Stevens, SAE Technical Paper Series No. 920163. The test method is a modification of ASTM E96. The tests were carried out at 23° C. Results are reported in g/m²/day in Table III.

Control Example A consisted of a single layer of the compounded fluoroelastomer composition having a thickness of 0.76 mm. After being cured as, described for the Example 1 the composition was tested in Thwing Albert permeation cups as described for Example 1. Results are shown in Table I.

TABLE III

| Time (Hours) | FUEL PERMEATION RATE (g/m²/day) | | | |
|---|---|---|---|---|
| | Fuel C/Methanol (75/25) | | Fuel C/Ethanol (90/10) | |
| | Cont. A | Ex. 1 | Cont. A | Ex. 1 |
| 48 | — | −0.17 | — | −0.06 |
| 96 | 6.7 | −0.88 | −0.16 | −0.93 |
| 264 | 14.7 | 0.02 | 2.5 | 0 |
| 336 | 15.2 | 0.08 | 3.8 | −0.26 |
| 408 | 19.9 | — | 5.6 | — |
| 672 | 15.0 | 0.25 | 4.0 | −0.27 |

The laminates of the present invention exhibit markedly lower fuel permeation rates compared to the fluoroelastomer alone, while retaining the flexibility of a conventional fluoroelastomer. Negative values for fuel permeation rate indicate that no fuel permeation has occurred, but that there has some moisture absorption.

Example 2

A hose was prepared by extrusion of a 0.030 inch (0.76 mm) thick layer of the fluoroelastomer compound of Example 1 onto a flexible 0.355 inch (9.0 mm) EPDM mandrel. The fluoroelastomer compound was prepared in a 2.5 inch (63.5 mm) cold feed Davis Standard extruder and was applied to the mandrel using a conventional crosshead extrusion process. After the fluoroelastomer compound was on the mandrel, a tape of non-elastomeric fluoropolymer was spirally wrapped over the fluoroelastomer, using nominally 10% overlap. The tape was 1.75 inches (44.5 mm) wide by 0.002 inches (0.05 mm) thick, and was a copolymer of tetrafluoroethylene and hexafluoropropylene, corona discharge treated to improve adhesion, of the same grade used in Example 1. This laminate was then fed back through the crosshead on the Davis Standard extruder with a layer of 0.040 inch (1.0 mm) of the chlorosulfonated polyethylene compound of Example 1 being applied. This laminate was then fed into a yarn braider, and a textile braid of polyester was applied over the chlorosulfonated polyethylene elastomer compound. Lastly, a 0.080 inch (2.0 mm) in thickness of the same chlorosulfonated polyethylene elastomer compound was applied to cover the hose.

The hose was then placed in a steam vulcanizer for 40 minutes at 80 psig (0.55 MPa) at 162° C. to crosslink the elastomers in the laminate. The hose was taken out of the autoclave and the EPDM mandrel was removed. Adhesion of the copolymer of tetrafluoroethylene and hexafluoropropylene to both the fluoroelastomer compound and the chlorosulfonated polyethylene compound layers was good. This hose was tested by circulating M25 fuel through a section of hose under pressure of 2 atm (0.2 MPa) at 40° C. and at 60° C. according to SAE J 1737. Measured permeation rates were, respectively, 12 and 8 g/m²/day. Values near 10g/m²/day are close to the lower detection limit of this test.

Example 3

A hose was prepared having a 0.045 inch (1.1 mm) veneer of the same fluoroelastomer compound as described in Example 2 extruded onto an EPDM mandrel using the same 2.5 inch (63.5 mm) Davis Standard 20:1 extruder. The fluoroelastomer veneer then was wrapped with the non-elastomeric fluoropolymer tape used in Example 2. The resultant article was braided with polyester yarn and then covered with the chlorosulfonated polyethylene compound of Example 1. The resulting hose was steam vulcanized for 40 minutes at 80 psig (0.55 MPa) at 324° F. (162° C.) and the EPDM mandrel was removed. The finished hose exhibited good adhesion between the layer containing the non-elastomeric fluoropolymer and the fluoroelastomer as well as between the chlorosulfonated polyethylene and the non-elastomeric fluoropolymer where it had bled fitrough the openings of the yarn braid. Fuel permeation rate of the hose structure was measured as 9 and 11 g/m²/day by the same method as used in Example 2 and the hose exhibited the flexibility of fluoroelastomer hoses.

Example 4

A laminate was prepared as described in Example 1 with the following modifications: the chlorosulfonated polyethylene compound layer was 0.160 inches (4.1 mm) thick, the fluoroelastomer layer was 0.039 inches (1.0 mm) thick, and the fluoroelastomer precompound consisted of a mixture of a copolymer of vinylidene fluoride, hexafluoropropylene, and tetrafluoroethylene (monomer weight ratio 45/31/24, prepared generally by the procedure of U.S. Pat. No. 2,968,649) and 0.15 phr of benzyl triphenyl phosphonium chloride and 2.6 phr of VITON ® Curative No. 50. The fluoroelastomer compound formulation was as shown below in Table IV.

TABLE IV

| Fluoroelastomer Compound | |
|---|---|
| Ingredient | Parts By Weight |
| Fluoroelastomer Precompound | 100 |
| MgO | 6 |
| MT Black (N990) | 15 |
| Magnesium Silicate | 20 |
| Carnauba Wax | 1 |
| Ca(OH)₂ | 4 |

When tested by the Thwing Albert cup method, with the fluoroelastomer layer in contact with the fluid, using M25 fuel for 240 hours, the average permeation rate was −0.21 g/m²/day.

Example 5

A laminatate was prepared using the same general method as described in Example 1 with the following modifications. The fluoroelastomer compound of Example 4 was used as the composition of the first layer in a thickness of 0.039 inches (1 mm). The second layer was the corona discharge treated non-elastomeric fluoropolymer film of Example 1. The chlorosulfonated polyethylene compound of Example 1 was used as the composition of the third layer in a thickness of 0.039 inches (1.0 mm). The laminate was tested for fuel permeation by the Thwing Albert cup method, with the fluoroelastomer layer in contact with the fluid, using M25 fuel for 240 hours. Average permeation rate was 0.01 g/m²/day.

Control Example B

A laminate was prepared and tested as described in Example 5, except that no non-elastomeric fluoropolymer was used. Average fuel permeation rate was 5.0 g/M²/day.

Control Example C

A sample of the cured laminate of Example 5 was exposed to M25 fluid so that only the chlorosulfonated polyethylene compound layer was in contact with the M25 fluid. The chlorosulfonated polyethylene compound exhibited a volume swell of 86% when tested according to ASTM D 471 in Fuel C for 70 hours at 23° C. Average fuel permeation rate was 5.0 g/m²/day (after 192 hours). This is the same value as for Control Example B, the same structure without a non-elastomeric fluoropolymer film layer. This indicates that elastomers having high fuel swells are not suitable for use as the first layer of the laminates of the invention.

Example 6

Example 5 was repeated except that the second layer of the laminate was a corona discharge treated film of a copolymer of tetrafluoroethylene and perfluoro(alkyl vinyl) ether (TEFLON® PFA fluoropolymer film. grade 200CLP20, available from E. I. du Pont de Nemours and Co.). Average fuel permeation rate was 0.39 g/m²/day.

Example 7

Example 5 was repeated except that the second layer of the laminate was a corona discharge treated film of a modified ethylene/tetrafluoroethylene copolymer (TEFZEL® ETFE fluoropolymer film grade 200CLZ20, available from E. I. du Pont de Nemours and Co.). Average fuel permeation rate was 0.56 g/m²/day.

Example 8

A cured laminate was prepared as described in Example 5 except that a different elastomer compound was used as the composition of the third layer. The compound consisted of a mixture of 100 parts of a 50/50 blend of ethylene/acrylic elastomers (Mooney viscosities $ML_{1+4}$@100° C. of 16 and 27 VAMAC® G and VAMAC® HG, available from E. I. du Pont de Nemours and Co.), 0.5 part ARMEEN® 18D (octadecylamine), 1.5 parts stearic acid, 1 part VANFRE® VAM (a complex organic alkyl acid phosphate processing aid), 2 parts NAUGARD® 445 [4,4'-bis($\alpha$, $\alpha$-dimethylbenzyl)diphenylamine], 70 parts N762 carbon black, 60 parts ATOMITE® Whiting (calcium carbonate), 5 parts dioctyl sebacate, 2.3 parts triethylenetetrmmine, and 4 parts N,N'-di-ortho-tolylguanidine. The cured laminate was tested by the Thwing Albert cup method, with the fluoroelastomer layer in contact with the fluid, using M25 fuel for 240 hours. Average permeation rate was 0.57 g/m²/day.

Example 9

A cured laminate was prepared as described in Example 5 except that a different elastomer compound was used as the composition of the third layer. The compound consisted of a mixture of 100 parts of a butadiene acrylonitrile copolymer (acrylonitrile content 33%; Mooney viscosity $ML_{1+4}$@100° C. of 60; NIPOL® 1032, available from Zeon Chemicals), 0.5 part stearic acid, 2 parts zinc oxide, 10 parts calcium hydroxide, 1 part PE 617A (low molecular weight polyethylene), 2 parts NAUGAWHITE® (an alkylated bisphenol), 10 parts N762 carbon black, 40 parts HISIL® EP amorphous silica, 30 parts MISTRON VAPOR® powdered talc, 10 parts tributyl phosphate, 1 part ALIQUAT® 336 (trioctylammonium chloride), 1,5 parts SI-69® silane coupling agent [bis-(3-triethoxysilylpropyl)tetrasulfide], 2.1 parts TAC DRIMIX® (triallylisocyanurate), and 6 parts DICUP® 40 KE (40% dicumyl peroxide, 60% inert filler). The cured laminate was tested by the Thwing Albert cup method, with the fluoroelastomer layer in contact with the fluid, using M25 fuel for 240 hours. Average permeation rate was 0.80 g/M²/day.

Example 10

A cured laminate was prepared as described in Example 5 except that a different elastomer compound was used as the composition of the third layer. The compound consisted of 100 parts epichlorohydrinethylene oxide copolymer (25% C1, Mooney viscosity $ML_{1+4}$ @100° C. of 65, HYDRIN® C65, available from Zeon Chemical Co.), 0.5 parts stearic acid, 15 parts HARWICK® 1096 (dibasic lead phosphite), 5 parts calcium hydroxide, 1 part PPA 790 fluoroaliphatic alcohol, 0.6 part methyl nicklate, 0.9 part nickel dibutyldithiocarbamate, 40 parts N990 carbon black, 45 parts N762 carbon black, 15 parts N550 carbon black, 5 parts dioctylphthalate, 3 parts PARAPLEX® G50 polyester plasticizer, 2.5 parts EPON® 828 epoxy resin (bisphenol A-epoxy resin), 1.7 parts DYNAMAR® 5166 processing additive (3M Co.), 1.5 parts DYNAMAR® 5157 processing additive (3M Co.), and 2 parts DIAK® No. 3 (N,N'-di-cinnamylidene-1,6-hexanediamine). The cured laminate was tested by the Thwing Albert cup method, with the fluoroelastomer layer in contact with the fluid, using M25 fuel for 240 hours. Average permeation rate was 0.29 g/m²/day.

Example 11

A cured laminate was prepared as described in Example 5 except that a different elastomer compound was used as the composition of the third layer. The compound consisted of a mixture of 100 parts of chlorinated polyethylene (36% Cl; Mooney viscosity $ML_{1+4}$ @ 121° C. of 80; TYRIN® CMO 136 chlorinated polyethylene, available from Dow Chemical Co.), 20 parts magnesium oxide, 10 parts calcium hydroxide, 5 parts KENFLEX® A plasticizer (alkylnaphthalene formalite), 40 parts N762 carbon black, 60 parts calcium carbonate, 15 parts dioctyl sebacate, 3 parts PE 617A (low molecular weight polyethylene), 3 parts CARBOWAX® 3350 wax (polyethylene glycol wax), 5 parts TAC DRIMIX® (triallylisocyanurate), 5 parts RICOBOND® 173 1HS (a maleic anhydride/polybutadiene adduct), and 7 parts VULCUP® 40KE peroxide (40% -bis-t-butyl peroxide). The cured laminate was tested by the Thwing Albert cup method, with the fluoroelastomer layer in contact with the fluid, using M25 fuel for 240 hours. Average permeation rate was 0.09 g/m²/day.

Example 12

A cured laminate was prepared as described in Example 5 except that a different elastomer compound was used as the composition of the third layer. The compound consisted of a mixture of 100 parts of Neoprene WRT (copolymer of chloroprene and 2,3-dichloro-1,3-butadiene, Mooney viscosity $ML_{1+4}$ @100° C. of 46; available from E. I. du Pont de Nemours & Co.), 4 parts magnesium oxide, 5 parts KENFLEX ® A plasticizer (alkylnaphthalene formalite), 5 parts dioctyl sebacate, 4 parts STRUKTOL ® WB 16 (a mixture of aliphatic fatty acid esters), 5 parts EPON ® 828 epoxy resin (bisphenol A-epoxy resin), 4 parts octamine, 40 parts HISIL ® 233 silica, 40 parts N660 carbon black, 5 parts zinc oxide, 10 parts calcium oxide, and 2 parts ethylene thiourea. The cured laminate was tested by the Thwing Albert cup method, with the fluoroelastomer layer in contact with the fluid, using M25 fuel for 240 hours. Average permeation rate was $-0.24$ g/M²/day.

Example 13

A cured laminate was prepared as described in Example 5 except that the first: and third layers were composed of the compounded fluoroelastomer composition of Example 4. The cured laminate was tested by the Thwing Albert cup method using M25 fuel for 240 hours. Average permeation rate was 0.13 g/m²/day.

Example 14

A cured three layer laminate analogous to that of Example 13 was prepared, wherein the second layer was a 0.002 inch (0.05 mm) thickness of the corona discharge treated non-elastomeric fluoropolymer film of Example 1, and the first and third layers were the same and of a thickness of 0.039 inches (1.0 mm). The first and third layers were composed of the compounded nitrile rubber used for layer 3 in Example 9. The nitrile rubber compound exhibited a volume swell of 49% when tested according to ASTM D 471 in Fuel C for 70 hours 23° C. The cured laminate was tested by the Thwing Albert cup method, using M25 fuel for 240 hours. Average permeation rate was 39 g/M²/day.

Control Example D

Example 14 was repeated except that a two layer cured laminate, consisting of layers 1 and 3 of Example 14, was prepared instead of a three layer cured laminate. The composition was tested as in Example 14 and the average permeation rate was 851 g/M²/day.

Control Example E

Example 14 was repeated except that the polymer of the first and third layers was composed of a compounded low acrylonitrile content acrylonitrile butadiene rubber, NIPOL ® 1014 21 wt % acrylonitrile, Mooney viscosity $ML_{1+4}$@100° C. of 80) available from Zeon Chemicals. The same compounding ingredients were used in the same concentrations as in Example 14, except that the NAUGAWHITE ® was omitted. The cured-laminate was tested as in Example 14 and the average permeation rate was 367.5 g/M²/day. Volume swell of the cured and compounded butadiene acrylonitrile formulation was 77%. This control example illustrates that laminates wherein a polymer having volume swell in excess of 65% is used in fuel contact are deficient in fuel permeability.

Example 15

Example 14 was repeated except that the first and third layers were composed of the compounded epichlorohydrin-ethylene oxide copolymer composition of Example 10. The compounded epichlorohydrin-ethylene oxide composition exhibited a volume swell of 25% when tested according to ASTM D 471 in Fuel C for 70 hours 23° C. The cured laminate was tested by the Thwing Albert cup method using M25 fuel for 240 hours. Average permeation rate was 32 g/M²/day.

Control Example F

Example 15 was repeated except that a two layer cured laminate, consisting of layers 1 and 3 of Example 15, was prepared instead of a three layer cured laminate. The composition was tested as in Example 15 and average permeation rate was 983 g/mm/day.

Example 16

Example 14 was repeated except that the first and third layers were composed of a compounded mixture of 100 parts of ZETPOL ® 2010 hydrogenated nitrile rubber (36% acrylonitrile, 5% unsaturation Mooney viscosity $ML_{1+4}$@100° C. of 80, available from Zeon Chemicals), 10 parts calcium hydroxide, 10 parts N762 carbon black, 1 part PEG17A (low molecular weight polyethylene), 2.1 parts TAC DRIMIX® (triallylisocyanurate), 2 parts zinc oxide, 0.5 part stearic acid, 40 parts HISIL ® EP amorphous silica, 30 parts MISTRON VAPOR ® powdered talc, 10 parts tributyl phosphate, 1 part ALIQUAT ® 336 (trioctylammonium chloride), 1.5 parts SI-69 ® silane coupling agent [bis-(3-triethoxysilylpropyl)tetrasulfide], and 6 parts DICUP ® 4 OKE(40%) dicumyl peroxide, 60% nert filler). The cured compounded composition exhibited a volume, swell of 61% when tested according to ASTM D 471 in Fuel C for 70 hours @23° C. The cured laminate was tested by the Thwing Albert cup method using M25 fuel for 240 hours. Permeation rate was 4.6 g/M²/day. Another sample had a permeation rate of 7.5 g/M²/day after 312 hours.

Control Example G

Example 16 was repeated except that a two layer cured laminate, consisting of layers 1 and 3 of Example 16, was prepared instead of a three layer cured laminate. The composition was tested as in Example 16 and average permeation rate was 711 g/M²/day.

Example 17

A cured laminate was prepared as described in Example 5 except that a different elastomer compound was used as the composition of the third layer. The compound consisted of a mixture of 100 parts of SILASTIC ® LS fluorosilicone rubber, 1 part red iron oxide, and 1 part LUPERCO ® XL peroxide [2,5-dimethyl-2,5-(di-t-butylperoxy)hexane]. The cured laminate was tested by the Thwing Albert cup method, with the fluoroelastomer layer in contact with the fluid, using M25 fuel for 240 hours. Average permeation rate was 0.66 g/M²/day.

I claim:

1. A laminar structure comprising, and bonded together in the order specified, (a) a first layer, having a thickness of 0.1 to 1.5 mm, comprising an elastomer which, when cured, has a volume swell no greater than 65%, as determined according to ASTM D 471, Reference Fuel C, 70 hours;

(b) a second layer, having a thickness of 0.01 to 0.1 mm, comprising a non-elastomeric fluoropolymer which has been treated to promote adhesion; and (c) a third layer, having a thickness of 0.1 to 4.0 mm, comprising an elastomer.

2. The laminar structure of claim 1 wherein the elastomer of the first layer is selected from the group consisting of acrylonitrile butadiene rubbers having acrylonitrile contents greater than 25% by weight, copolymers of epichlorohydrin and ethylene oxide, hydrogenated acrylonitrile butadiene rubbers, and fluoroelastomers.

3. The laminar structure of claim 2 wherein the elastomer of the first layer is a fluoroelastomer.

4. The laminar structure of claim 3 wherein the fluoroelastomer is a copolymer prepared from tetrafluoroethylene, vinylidene fluoride, and hexafluoropropylene.

5. The laminar structure of claim 4 wherein the fluoroelastomer has a fluorine content of greater than 65% by weight.

6. The laminar structure of claim 1 wherein the nonelastomeric fluoropolymer is selected from the group consisting of tetrafluoroethylene homopolymers and tetrafluoroethylene copolymers.

7. The laminar structure of claim 6 wherein the non-elastomeric fluoropolymer is a copolymer of tetrafluoroethylene and hexafluoropropylene.

8. The laminar structure of claim 1 wherein the elastomer of the third layer is a non-fluorinated elastomer.

9. The laminar structure of claim 8 wherein the elastomer of the third layer is selected, from the group consisting of chlorosulfonated polyethylene, acrylonitrile butadiene rubber, and epichlorohydrin-ethylene oxide copolymers.

10. The laminar structure of claim 1 wherein the first layer has a thickness of less than 1.0 mm.

11. The laminar structure of claim 1 wherein the third layer has a thickness of 1.0–2.5 mm.

12. The laminar structure of claim 1 wherein the structure further comprises a reinforcing braiding.

13. The laminar structure of claim 12 wherein the reinforcing braiding is between layers (b) and (c).

14. The laminar structure of claim 12 wherein the reinforcing braiding is exterior to the third layer and the laminar structure comprises an additional elastomer layer adjacent to the reinforcing braiding.

15. The laminar structure of claim 12 wherein the reinforcing braiding is selected from at least one of polyester and polyammid.

16. The laminar structure of claim 1 wherein the structure is in the form of a tube or hose and the third layer is the exterior layer.

17. The laminar structure of claim 1 wherein the elastomers of the first and third layers are fluorinated elastomers.

* * * * *

UNITED STATES PATENT AND TRADEMARK OFFICE
CERTIFICATE OF CORRECTION

PATENT NO. : 5,427,831

DATED : June 27, 1995

INVENTOR(S) : Ronald D. Stevens

It is certified that error appears in the above-identified patent and that said Letters Patent is hereby corrected as shown below:

Column 12, line 25, change the word "polyammid" to read -- polyaramid --.

Signed and Sealed this

Twenty-first Day of May, 1996

*Attest:*

BRUCE LEHMAN

*Attesting Officer*    Commissioner of Patents and Trademarks

REEXAMINATION CERTIFICATE (3414th)

United States Patent [19]

Stevens

[11] B1 5,427,831

[45] Certificate Issued Jan. 6, 1998

[54] FLUOROPOLYMER LAMINATES

[75] Inventor: Ronald D. Stevens, Norton, Ohio

[73] Assignee: E.I. Du Pont de Nemours and Company, Wilmington, Del.

Reexamination Request:
No. 90/004,511, Jan. 9, 1997

Reexamination Certificate for:
Patent No.: 5,427,831
Issued: Jun. 27, 1995
Appl. No.: 249,551
Filed: Jun. 2, 1994

Certificate of Correction issued May 21, 1996.

Related U.S. Application Data

[63] Continuation-in-part of Ser. No. 150,906, Nov. 12, 1993, Pat. No. 5,320,888.

[51] Int. Cl.$^6$ ............................. B32B 1/08; B32B 27/28
[52] U.S. Cl. ................... 428/36.2; 428/36.8; 428/36.91; 428/252; 428/421; 428/422
[58] Field of Search ...................... 428/36.2, 36.8, 428/36.91, 252, 421, 422

[56] References Cited

U.S. PATENT DOCUMENTS

| | | | |
|---|---|---|---|
| 4,800,109 | 1/1989 | Washizu | 428/34.9 |
| 4,806,351 | 2/1989 | Sugimoto et al. | 428/421 |
| 4,895,752 | 1/1990 | McEwen | 428/245 |

FOREIGN PATENT DOCUMENTS

| | | |
|---|---|---|
| 0 202 996 | 11/1986 | European Pat. Off. . |
| 0 545 368 | 6/1993 | European Pat. Off. . |
| 0 551 094 | 7/1993 | European Pat. Off. . |
| 2 032 847 | 5/1980 | United Kingdom . |
| WO 93/21466 | 10/1993 | WIPO . |

*Primary Examiner*—James C. Cannon

[57] ABSTRACT

Laminates of low swell elastomer, non-elastomeric fluoropolymer, and elastomer provide an excellent combination of flexibility and fuel permeation resistance.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

* * * * *